United States Patent [19]

Lowsky et al.

[11] Patent Number: 4,935,127
[45] Date of Patent: Jun. 19, 1990

[54] PRESSURE RELIEF VALVE ASSEMBLY WITH PLASTIC, ONE-PIECE VALVE

[75] Inventors: John Lowsky; Scott Trierwiler; Nicholas Torchia, all of Fayetteville, N.C.

[73] Assignee: Facet Enterprises, Inc., Tulsa, Okla.

[21] Appl. No.: 183,248

[22] Filed: Apr. 19, 1988

[51] Int. Cl.$^5$ .................................................. B01D 27/10
[52] U.S. Cl. .................................... 210/130; 210/136; 210/168; 210/434; 210/440; 137/512.1; 251/368
[58] Field of Search ............. 137/512.1; 251/368; 210/130, 133, 136, 434, 440, 457, 168

[56] References Cited

U.S. PATENT DOCUMENTS

| | | | |
|---|---|---|---|
| 1,781,874 | 11/1930 | Hopkins | 210/136 |
| 2,296,492 | 9/1942 | Begley, Sr. | 137/512.1 |
| 2,439,936 | 4/1948 | Kasten | 210/183 |
| 2,734,636 | 2/1956 | Foster | 210/164 |
| 2,888,141 | 5/1959 | Coates et al. | 210/440 |
| 2,904,065 | 9/1959 | Butlin | 251/368 |
| 2,995,249 | 8/1961 | Boewe et al. | 210/130 |
| 3,061,101 | 10/1962 | Humbert, Jr. | 210/130 |
| 3,146,194 | 8/1964 | Hathaway | 210/130 |
| 3,156,259 | 11/1964 | Havelka et al. | 251/337 |
| 3,187,896 | 6/1965 | Wilkiinson | 210/130 |
| 3,221,880 | 12/1965 | Wilkinson | 210/130 |
| 3,231,089 | 1/1966 | Thornton | 210/130 |
| 3,235,085 | 2/1966 | Humbert, Jr. | 210/136 |
| 3,272,342 | 9/1966 | McLaren et al. | 210/440 |
| 3,305,095 | 2/1967 | Hathaway | 210/136 |
| 3,315,809 | 4/1967 | Hultgren | 210/130 |
| 3,369,666 | 2/1968 | Hultgren et al. | 210/130 |
| 3,473,664 | 10/1969 | Hulgren | 210/136 |
| 3,524,469 | 8/1970 | Jebe | 251/368 |
| 3,529,722 | 9/1970 | Humbert et al. | 210/136 |
| 3,567,023 | 3/1971 | Buckman et al. | 210/130 |
| 3,586,171 | 6/1971 | Offer | 210/136 |
| 3,589,517 | 6/1971 | Palmai | 210/130 |
| 3,608,724 | 9/1971 | Baldwin | 210/130 |
| 3,618,775 | 11/1971 | Hulgren | 210/130 |
| 3,633,750 | 1/1972 | Braun et al. | 210/130 |
| 3,640,390 | 2/1972 | Goy et al. | 210/130 |
| 3,669,144 | 6/1972 | Palmai | 210/130 |
| 3,695,437 | 10/1972 | Shaltis | 210/136 |
| 3,724,665 | 4/1973 | Hall | 210/130 |
| 3,807,561 | 4/1974 | Cullis | 210/130 |
| 3,855,128 | 12/1974 | Shaltz et al. | 210/130 |
| 3,928,201 | 12/1975 | Junck et al. | 210/132 |
| 3,957,640 | 5/1976 | Stack | 210/130 |
| 4,028,243 | 6/1977 | Offer et al. | 210/130 |
| 4,035,306 | 7/1977 | Maddocks | 210/440 |
| 4,045,349 | 8/1977 | Humbert, Jr. | 210/232 |
| 4,144,168 | 3/1979 | Thornton | 210/130 |
| 4,400,864 | 8/1983 | Peyton et al. | 210/440 |
| 4,497,706 | 2/1985 | Pickett et al. | 210/130 |

FOREIGN PATENT DOCUMENTS 1075167 4/1980 Canada .
982466 2/1965 United Kingdom .

Primary Examiner—W. Gary Jones
Assistant Examiner—Christopher Upton
Attorney, Agent, or Firm—Staas & Halsey

[57] ABSTRACT

A pressure relief valve assembly is described including a valve body having a sleeve portion, a slotted portion and axial extension legs, all of which are integrally formed as one-piece by injection molding from plastic. The legs are hooked at free ends to restrain a compression spring which biases a one-piece, plastic washer into a seated position over the slotted portion. The washer is substantially planar, but with inner and outer circumferential lips, each having a rounded profile. The lips are spaced apart by a medial planar surface area. The inner and outer lips engage inner and outer surfaces, respectively, around radial slots formed in the slotted portion which act as a valve seat. The washer also includes an upwardly extending projection opposite the sealing surface which receives the spring radially inward such that the spring exerts an even force on the washer. The washer is also provided with ribs which add structural support and act to distribute the load of the spring evenly from one side of the sealing surface to the other.

3 Claims, 4 Drawing Sheets

PRESSURE RELIEF VALVE ASSEMBLY WITH PLASTIC, ONE-PIECE VALVE

BACKGROUND OF THE INVENTION

This invention relates to fluid filters and, more particularly, to a pressure relief valve assembly for a spin-on, disposable, oil filter.

Spin-on, disposable, oil filters are used with internal combustion engines to filter out small particulate matter which would otherwise abrade moving engine parts. After a recommended time interval, the filter is replaced and is therefore considered disposable.

Such an oil filter has an outer casing, a filter element disposed within the casing, an end plate fixed to one end of the casing, a pressure relief valve assembly, which enables by-pass of the filter element, when desired, and an antidrain back valve. Plural inlet ports and a central outlet port are provided in the end plate to circulate oil through the filter element. The central outlet port is usually threaded for "spin-on" mounting to the engine.

Relief valve assemblies are known generally to be of two types, metal and plastic.

Examples of metal pressure relief valves are described in U.S. Pat. Nos. 3,473,664, issued to HULTGREN; 4,028,243, issued to OFFER et al.; and 4,497,706, issued to PICKETT et al.

FIG. 1 herein shows a conventional metal pressure relief valve assembly 10 in a filter 11. The filter 11 includes a filter element 22 abutting the pressure relief valve assembly 10 and an antidrain back valve 24.

This pressure relief valve assembly 10 includes a metal upper housing 12 connected to a metal lower housing 14 having oil inlet holes 15 formed radially therein. The upper housing 12 retains a compression spring 16 which urges an annular metal piston 18 and corresponding rubber gasket 20 downwardly into a seated position on the lower housing 14 over the inlet holes 15.

When, e.g. the filter element 22 becomes full of particulate matter, oil pressure at the oil inlet holes 15 increases and eventually overcomes the force of the compression spring 16, causing the gasket 18 and piston 20 to unseat from the lower housing 14. The oil then is allowed to by-pass the filter element 22 and leave the oil filter through the filter element center tube 26 and an oil outlet port 28 formed in an end plate 29.

It is known in the art that the above-described metal valves are relatively expensive to produce due to labor- and energy-intensive metal forming, the relative number of parts and the assembly of these parts, using welding, brazing or soldering. Further, the seal created by the piston 18 and the flat sealing surface of the gasket 20 against the lower housing 14 deteriorates with time due to repeated temperature/pressure cycles.

As indicated above, plastic relief valve assemblies are also known as described in U.S. Pat. No. 3,156,259, issued to HAVELKA et al. and shown in FIG. 2 herein. The valve assembly 30 includes a metal valve plate 32 which is urged into a seated position against a valve body 42 flange 34 including oil inlet holes 36 by a compression spring 38. The spring 38 is biased between the valve plate 32 and hooked extensions 40 which are integrally formed of the valve body 42. The valve body 42 is molded of a plastic material and the flange 34 is also integrally formed therewith. The valve plate 32 is essentially an annular planar member having an inner, upright flange portion 44 which receives radially outwardly the spring 38.

Although HAVELKA et al. indicates the use of a metal piston 32 only, this patent in practice also requires, like the metal valve assembly 10 described above, a molded rubber gasket to effect the desired seal, as is evidenced by subsequent U.S. Pat. Nos. 3,589,517 issued to PALMAI and 4,028,243, issued to OFFER et al. Each of these subsequent patents utilizes the basic HAVELKA et al. relief valve design as well as a rubber piston.

Thus, plastic pressure relief valve assemblies are known to require both a metal piston and gasket, like the metal assemblies. As a result, plastic assemblies suffer from the same drawbacks as the metal assemblies discussed above.

Overall, it is desirous that a relief valve be capable of the lowest cost manufacture and the most efficient sealing properties. For example, having flexibility in choosing the sealing materials and structural design thereof is preferred to being limited to a particular combination of metal and rubber. Finally, it is desirous that a valve assembly be capable of relatively quick and easy automated assembly, requiring no welding, brazing, or soldering.

SUMMARY OF THE INVENTION

In light of the above-mentioned disadvantages in prior art pressure relief valve assemblies, it is an object of the present invention to provide an assembly having improved sealing and relief capability, but which is easier and more economical to manufacture and assemble.

It is another object of the present invention to provide an assembly wherein the valve is configured to improve sealing characteristics.

Finally, it is an object of the present invention to provide an assembly with a one-piece injection molded, plastic valve which effects improved, long-term sealing of the assembly, at lower manufacturing costs.

To achieve the foregoing and other objects of the present invention, and in accordance with the purposes of the invention, there is provided a pressure relief valve assembly for a fluid filter, including a valve body having a sleeve portion, a slotted portion and a pair of axial extension legs, all of which are integrally formed in a one-piece injection molding process of suitable plastic material. The legs are hooked at distal ends to restrain a compression spring which biases a valve in the form of a one-piece injection molded washer into a seated position over radial slots formed in the slotted portion. The washer is substantially planar, but includes as a sealing surface an inner circumferential lip and an outer circumferential lip, both having a rounded profile. The lips are spaced apart by a medial planar surface area. The inner and outer lips engage inner and outer, flat surfaces around the radial slots which act as a valve seat. The washer further includes an upwardly extending projection on a surface opposite the lips which receives the spring radially inwardly such that the spring exerts an even force on the washer. The washer is also provided with radial ribs which add structural support thereto and act to distribute the load of the spring evenly from one side of the sealing surface to the other.

Other features and advantages of the present invention will be apparent from the following description taken in conjunction with the accompanying drawings, in which like reference numerals designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

BRIEF DESCRIPTION OF THE PREFERRED EMBODIMENTS

The preferred embodiments of the present invention will now be described with reference to FIGS. 3–12.

Figure 3:
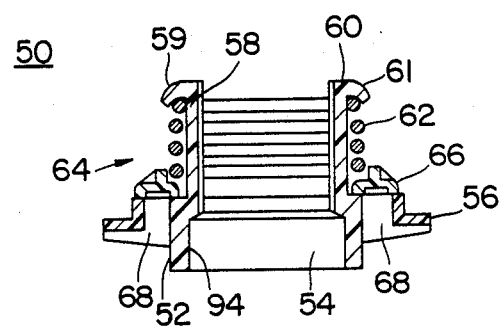
FIG. 3 is a side, cross sectional view of the pressure relief valve assembly according to the present invention.
Figure 4:
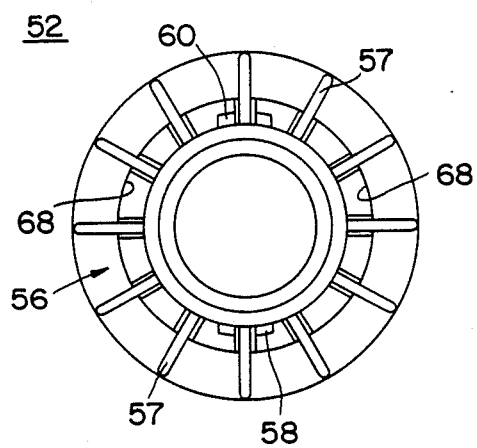
FIG. 4 is a top, plan view of a valve body according to the present invention.
Figure 5:
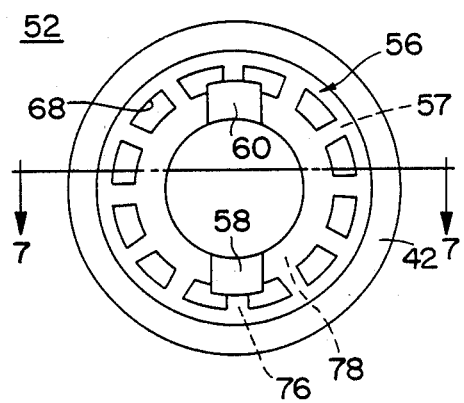
FIG. 5 is a bottom, plan view of the valve body according to the present invention.
Figure 6:
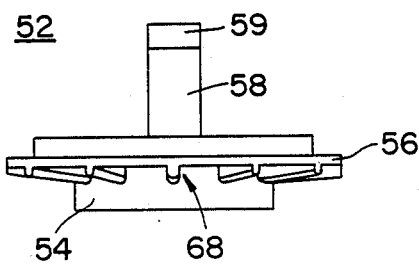
FIG. 6 is a side view of the valve body according to the present invention.

FIG. 3 is a side, cross-sectional view of the pressure relief valve assembly of the present invention indicated generally by reference numeral 50. The assembly 50 includes a valve body 52 and axial extension legs 58 and 60, all of which are integrally formed as one-piece by injection molding of suitable plastic material. The plastic is preferably a nylon. Other plastics can be used as long as they are able to withstand the repeated temperature and pressure cycles of a fluid filter.

As best seen in FIGS. 3–7, the valve body 52 includes a sleeve portion 54 and a slotted portion 56. The slotted portion 56 includes a plurality of radial slots 68 separated by ribs 57.

The legs 58, 60 terminate at free ends in hooks 59 and 61, respectively, to restrain a compression spring 62 which biases valve means 64 in the form of an annular washer 66 into a seated position over the radial slots 68 formed in the slotted portion 56. The washer 66 is biased by the spring 62 and is guided in its axial movement by the legs 58, 60.

Figure 7:
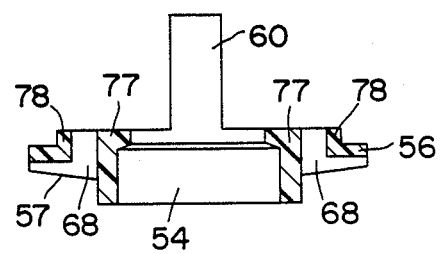
FIG. 7 is a side, cross sectional view of the valve body shown in FIG. 5 taken along line 7—7.
Figure 8:
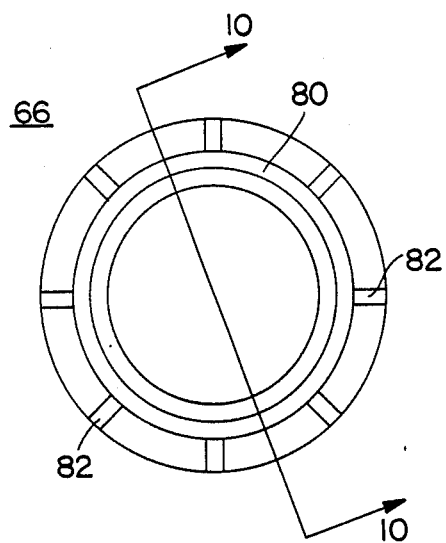
FIG. 8 is a top, plan view of the valve according to the present invention.
Figure 9:
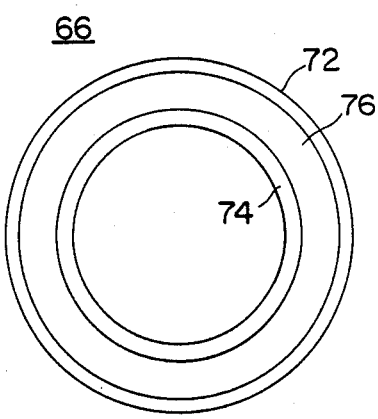
FIG. 9 is a bottom, plan view of the valve according to the present invention.
Figure 10:
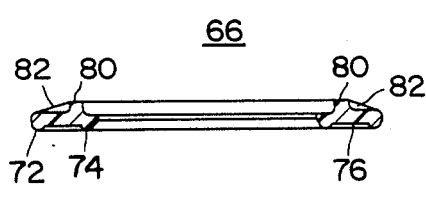
FIG. 10 is a side, cross-sectional view of the valve shown in FIG. 8 taken along line 10—10.
Figure 11:
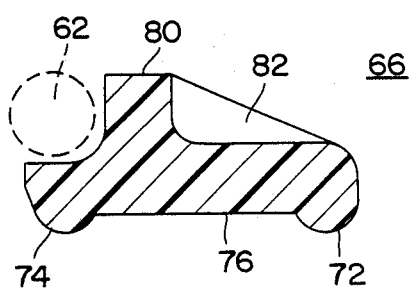
FIG. 11 is a partial enlarged view of the valve shown in FIG. 10.

As shown best in FIGS. 8–11, the washer 66 is substantially planar, but has a circumferential lip 74 formed at the inner peripheral edge of the washer 66 and a circumferential lip 72 formed at the outer peripheral edge of the washer 66, each having a rounded profile, and being spaced apart by a medial planar surface area 76 (FIGS. 3 and 7). Inner lip 74 and outer lip 72 engage inner and outer surfaces, 77 and 78, respectively, adjacent each radial slot 68 which act as a valve seat.

The washer 66, which is also molded by injection molding as a one-piece plastic member, further includes an upwardly extending projection 80, which receives the spring 62 radially inward thereof to exert an even force on the washer 66. This structure differs from the prior art metal pistons which include a projection positioned radially inward of the spring. This prior art arrangement was potentially susceptible to acting like a cantilever, which does not provide an even sealing surface over time.

Finally, the washer 66 is provided with ribs 82 which add structural support thereto and act to distribute the load of the spring 62 evenly between lips 72 and 74 and from one sealing surface 77 to the other 78.

Figure 1:
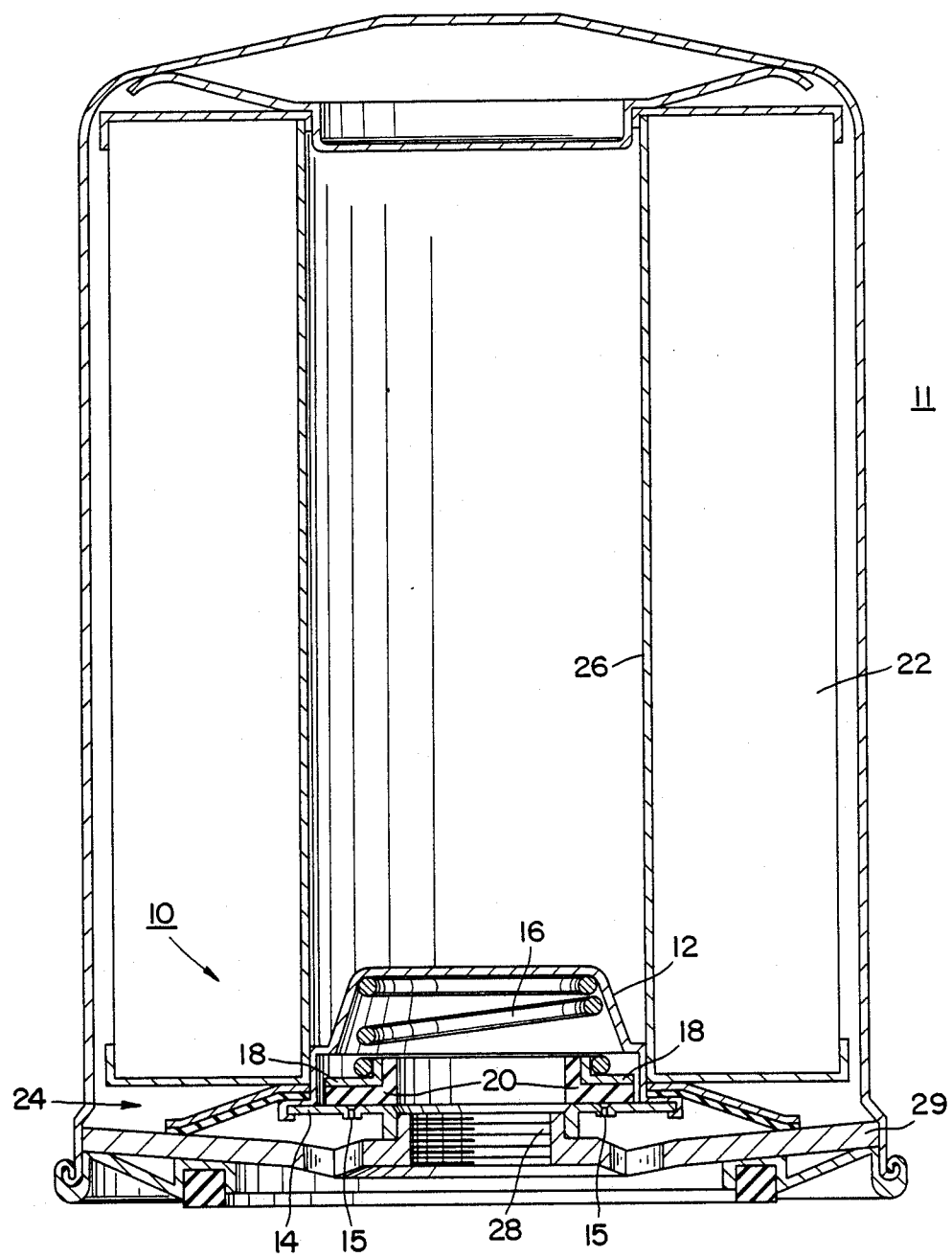
FIG. 1 is a elevated, cross-sectional view of a known fluid filter incorporating a metal pressure relief valve assembly.
Figure 2:
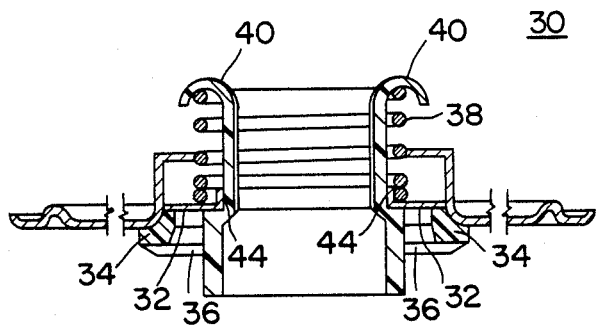
FIG. 2 is a side, cross-sectional view of a known plastic pressure relief valve assembly.

The above described pressure relief valve assembly 60 can be incorporated in a conventional filter such as shown in FIG. 1 herein and described above. The invention may also be incorporated in the filter described in assignee's U.S. Pat. No. 4,764,275 entitled FLUID FILTER AND METHOD FOR ATTACHING SAME IN SEALING RELATION TO A FILTER MOUNT, or co-pending application Ser. No. 205,632, entitled PLASTIC FLUID FILTER AND METHOD OF MANUFACTURING SAME. These applications are incorporated by reference herein.

Figure 12:
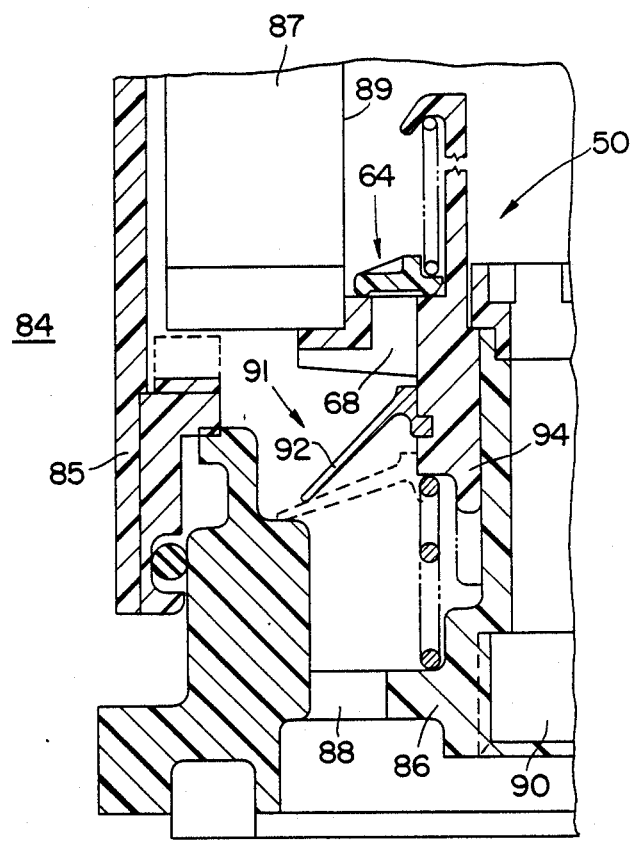
FIG. 12 is a side, partial, cross-sectional view of the assembly shown in FIG. 3 incorporated into a filter and including an antidrain back valve.

More particularly, referring to FIG. 12, a fluid filter 84 is shown employing the plastic pressure relief valve assembly 50 described above. The fluid filter 84 includes a plastic casing 85 and an end member or adaptor 86 fitted by a bayonet-type attachment to an open end of the casing 85. The casing 85 and end member 86 form a pressure vessel in which oil is filtered through a filter element 87.

Incoming oil passes through plural fluid inlets 88 provided in the end member 86, past an antidrain back valve (ADB) 91, through the filter element 87 to a center tube 89 which is longitudinally aligned with the relief valve assembly 50 and a fluid outlet 90. The ADB valve 91 includes a plastic radial flap 92 made of, e.g., a thermoplastic rubber or nylon and connected to the sleeve portion 54 by an interference fit. Alternatively, the flap 92 may be integrally formed with the valve body 52 by injection molding. The ADB valve 91 overlies the fluid inlets 88 in the end member 86 when the relief valve assembly 50 is connected to the end member 86 of the filter 84 to provide an antidrain back effect.

In the event of filter element 87 blockage, fluid pressure increases below the radial slots 68 until a threshold is reached. At that point, the valve means 64 unseats and allows oil to flow through the radial slots 68 of the valve body, into the center tube 89 and out the fluid outlet 90.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

We claim:

1. A pressure relief valve assembly, comprising:
   (a) a valve body, having
      (i) a sleeve portion defining a central outlet,
      (ii) a slotted portion formed on the sleeve portion and defining plural radial inlets, and (iii) two opposed arms extending axially and outwardly from the sleeve portion;
(b) a plastic valve means in a normally seated position over the plural radial inlets; and
(c) a spring disposed between free ends of the two arms and the valve means and normally biasing the valve means into the seated position,
wherein the valve body is a one-piece plastic washer,
wherein the washer has a non-planar sealing surface,
wherein the non-planar sealing surface includes inner and outer circumferential lips formed on opposite sides of a medial planar surface, and along inner and outer peripheral edges of the valve means, and
wherein the washer further includes
an annular projection extending upwardly from a surface opposite the sealing surface to receive the spring radially inward thereof, and plural equidistantly spaced radial ribs extending angularly between the annular projection and the outer peripheral edge of the washer.

2. A fluid filter, comprising:
(a) a casing having a closed end and an open end;
(b) an end member fixedly connected to the open end and having a central fluid outlet and plural fluid inlets disposed around the central outlet; and
(c) a pressure relief valve assembly, including
(i) a valve body having a sleeve portion defining a central outlet, a slotted portion formed on the sleeve portion and defining plural radial inlets, and two opposed arms extending axially and outwardly from the sleeve portion,
(ii) a plastic valve means in a normally seated position over the plural radial inlets, and
(iii) a spring disposed between free ends of the two arms and the valve means and normally biasing the valve means into the seated position,
wherein the valve means is a one-piece plastic washer,
wherein the washer includes a sealing portion with a non-planar sealing surface,
wherein the non-planar sealing surface includes inner and outer circumferential lips formed on opposite sides of a medial planar surface, and along inner and outer peripheral edges of the valve means,
wherein an annular projection extending upwardly from a surface opposite the sealing surface receives the spring radially inward thereof, and
wherein the washer further includes plural equidistantly spaced radial ribs extending angularly between the annular projection and the outer peripheral edge of the washer.

3. A fluid filter, comprising:
(a) a casing having a closed end and an open end;
(b) an end member fixedly connected to the open end and having a central fluid outlet and plural fluid inlets disposed around the central outlet; and
(c) a pressure relief valve assembly, including
(i) a valve body having a sleeve portion defining a central outlet, a slotted portion formed on the sleeve portion and defining plural radial inlets, and two opposed arms extending axially and outwardly from the sleeve portion,
(ii) a plastic valve means in a normally seated position over the plural radial inlets, and
(iii) a spring disposed between free ends of the two arms and the valve means and normally biasing the valve means into the seated position, and
(d) an antidrain back valve connected to the valve body and overlying the plural fluid inlets,
wherein the antidrain back valve and the sleeve portion of the valve body are integral.

* * * * *